US007055071B2

(12) United States Patent
Austen et al.

(10) Patent No.: US 7,055,071 B2
(45) Date of Patent: May 30, 2006

(54) METHOD AND APPARATUS FOR REPORTING ERROR LOGS IN A LOGICAL ENVIRONMENT

(75) Inventors: Christopher Harry Austen, Pflugerville, TX (US); Alongkorn Kitamorn, Austin, TX (US); Douglas Wayne Oliver, Round Rock, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 10/339,770

(22) Filed: Jan. 9, 2003

(65) Prior Publication Data

US 2004/0139368 A1    Jul. 15, 2004

(51) Int. Cl.
*G06F 11/00*  (2006.01)
(52) U.S. Cl. ....................................................... 714/48
(58) Field of Classification Search ................ 714/20, 714/48
See application file for complete search history.

(56) References Cited

U.S. PATENT DOCUMENTS

| 4,633,467 | A |   | 12/1986 | Abel et al. ................... 371/16 |
| 4,780,809 | A |   | 10/1988 | Woffinden et al. .......... 364/200 |
| 5,128,885 | A |   | 7/1992 | Janis et al. ................... 395/575 |
| 5,553,285 | A | * | 9/1996 | Krakauer et al. ............ 707/202 |
| 5,590,056 | A |   | 12/1996 | Barritz ......................... 364/550 |
| 5,592,638 | A |   | 1/1997 | Onodera ....................... 395/406 |
| 5,790,779 | A |   | 8/1998 | Ben-Natan et al. ..... 395/183.15 |
| 5,801,948 | A | * | 9/1998 | Wood et al. .................. 700/108 |
| 5,822,513 | A |   | 10/1998 | Ofer et al. ............... 395/183.18 |
| 5,847,972 | A |   | 12/1998 | Eick et al. ................... 364/514 A |
| 5,857,190 | A |   | 1/1999 | Brown ........................... 707/10 |
| 5,892,898 | A |   | 4/1999 | Fujii et al. ................. 395/185.1 |
| 5,892,917 | A |   | 4/1999 | Myerson .................. 395/200.54 |
| 6,493,837 | B1 | * | 12/2002 | Pang et al. ..................... 714/45 |
| 6,823,482 | B1 | * | 11/2004 | Ahrens et al. ................. 714/57 |

FOREIGN PATENT DOCUMENTS

| JP | 04242842 A | * | 8/1992 |
| JP | 7262054 A |   | 10/1995 |
| JP | 2001325165 A |   | 11/2001 |

* cited by examiner

*Primary Examiner*—Scott Baderman
*Assistant Examiner*—Brian Assessor
(74) *Attorney, Agent, or Firm*—Duke W. Yee; Mark E. McBurney; Mari Stewart

(57) ABSTRACT

A method, apparatus, and computer instructions for managing error logs. A request is received from a partition within a plurality of partitions in the logical partitioned data processing system to access error information. A determination is made as to whether the error information is located in a buffer. The error information is retrieved from a non-volatile memory in response to the error information being absent in the buffer. The retrieved error information retrieved from the non-volatile memory is stored in the buffer. This error information is stored in the buffer only for a selected period of time. After that period of time, this error information is deleted or removed from the buffer. In this manner, outdated error information is not returned to the plurality of partitions.

32 Claims, 4 Drawing Sheets

100 DATA PROCESSING SYSTEM

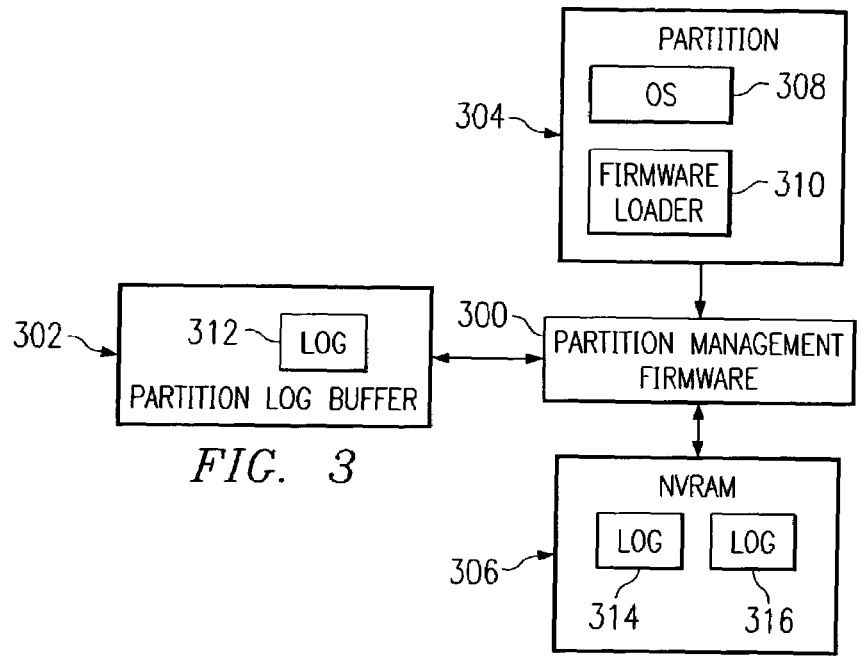
FIG. 3
```
                400
                  ↘
                        402
typedef  struct _PLB {
uint32      add_index;
uint32      retrieve_index [MAX_PARTITIONS_WITH_GLOBAL];  — 404
uint64_t    expire_time [MAX_PLB_LOG_ENTRIES];  — 406
uint32      started [MAX_PARTITIONS_WITH_GLOBAL];  — 408
uint8       rpa_log [MAX_PLB_LOG_ENTRIES] [MAX_ERR_LOG_SIZE];  — 410
} PLB;
```
FIG. 4
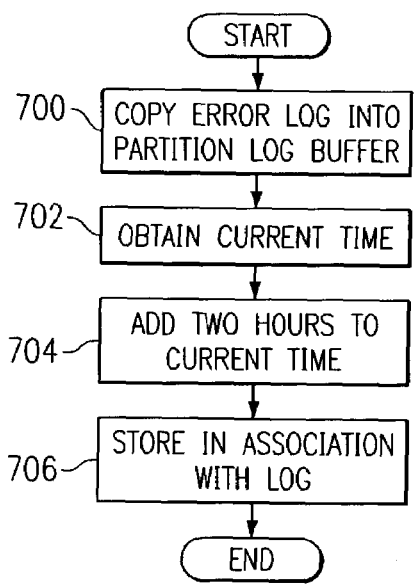
FIG. 7
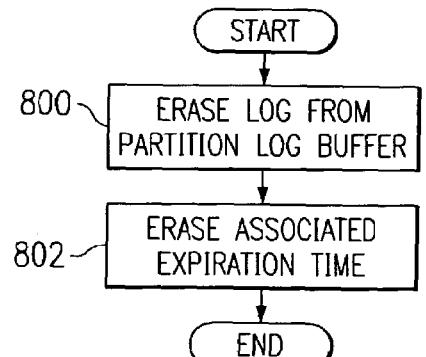
FIG. 8

METHOD AND APPARATUS FOR REPORTING ERROR LOGS IN A LOGICAL ENVIRONMENT

BACKGROUND OF THE INVENTION

1. Technical Field

The present invention relates generally to an improved data processing system, and in particular, to a method and apparatus for error analysis. Still more particularly, the present invention provides a method and apparatus for retrieving logs for a partition in a logical partitioned data processing system.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

An operating system within a LPAR data processing system may periodically call a routine to check states and report errors that are found. This routine is part of a run-time abstraction services (RTAS) component and is called an event scan. RTAS is designed to insulate an operating system from having to know about and manipulate platform functions that would require platform specific code. The RTAS is called as an interface to hardware, such as hardware registers. Each partition has a copy of RTAS in memory. RTAS is found in IBM eServer pSeries products, which are available from International Business Machines Corporation. The event scan function checks for error logs that may have been reported by various subsystems of the data processing system. These subsystems include, for example, the service processor, open firmware, and non-maskable machine interrupt code. Each of these subsystems places reported error logs for an operating system in a specific location. One location used by service processors to place reportable logs for a partition is a non-volatile random access memory (NVRAM). The event scan function searches the various locations used by these components to find for new non-reported error logs. When a new non-reported log is identified, this function reports the log to the operating system that the log is to be reported and marks the log so that it is no longer considered new and unreported. By marking the log in this manner, the event scan function will not report the log again at a later time. Additionally, this allows the space occupied by the log to be overlaid with a new non-reported log.

In a symmetric multiprocessor mode configuration, the entire data processing system is owned by one operating system. As a result, only one instance of the event scan function is called. With only one instance of the event scan function, any error log reported to the operating system can be marked as old and reported. In a LPAR environment, a few problems become apparent. For example, with each LPAR partition, an instance of the event scan function may be called. Each event scan function is required to report the same error logs to their respective operating systems. It is important that the NVRAM locations in which the subsystems place new error logs do not become clogged. Otherwise, errors may be missed. A partition within a LPAR system booted days or months after the data processing system has been started has no reason to receive outdated error logs even if the error would be considered new to the partition. In an LPAR system, the event scan function, called by one partition, is unable to mark an error log as old and reported because the error log may not be old or reported to another partition. Without this ability to mark error logs, logs cannot be removed, preventing the addition of new error logs when the memory space is used up.

Therefore, it would be advantageous to have an improved method, apparatus, and computer instructions for reporting error logs in a LPAR data processing system.

SUMMARY OF THE INVENTION

The present invention provides a method, apparatus, and computer instructions for managing error logs. A request is received from a partition within a plurality of partitions in the logical partitioned data processing system to access error information. A determination is made as to whether the error information is located in a buffer. The error information is retrieved from a non-volatile memory in response to the error information being absent in the buffer. The retrieved error information retrieved from the non-volatile memory is stored in the buffer. This error information is stored in the buffer only for a selected period of time. After that period of time, this error information is deleted or removed from the buffer. In this manner, outdated error information is not returned to the plurality of partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a diagram illustrating components used in managing error logs in accordance with a preferred embodiment of the present invention;

FIG. 4 is a diagram illustrating an example structure of a partition log buffer in accordance with a preferred embodiment of the present invention;

FIG. 7 is a flowchart of a process used for copying logs into a partition log buffer in accordance with a preferred embodiment of the present invention; and FIG. 8 is a flowchart of a process used for deleting a log in a partition log buffer in accordance with a preferred embodiment of the present invention.

DETAILED DESCRIPTION OF THE PREFERRED EMBODIMENT

Figure 1:
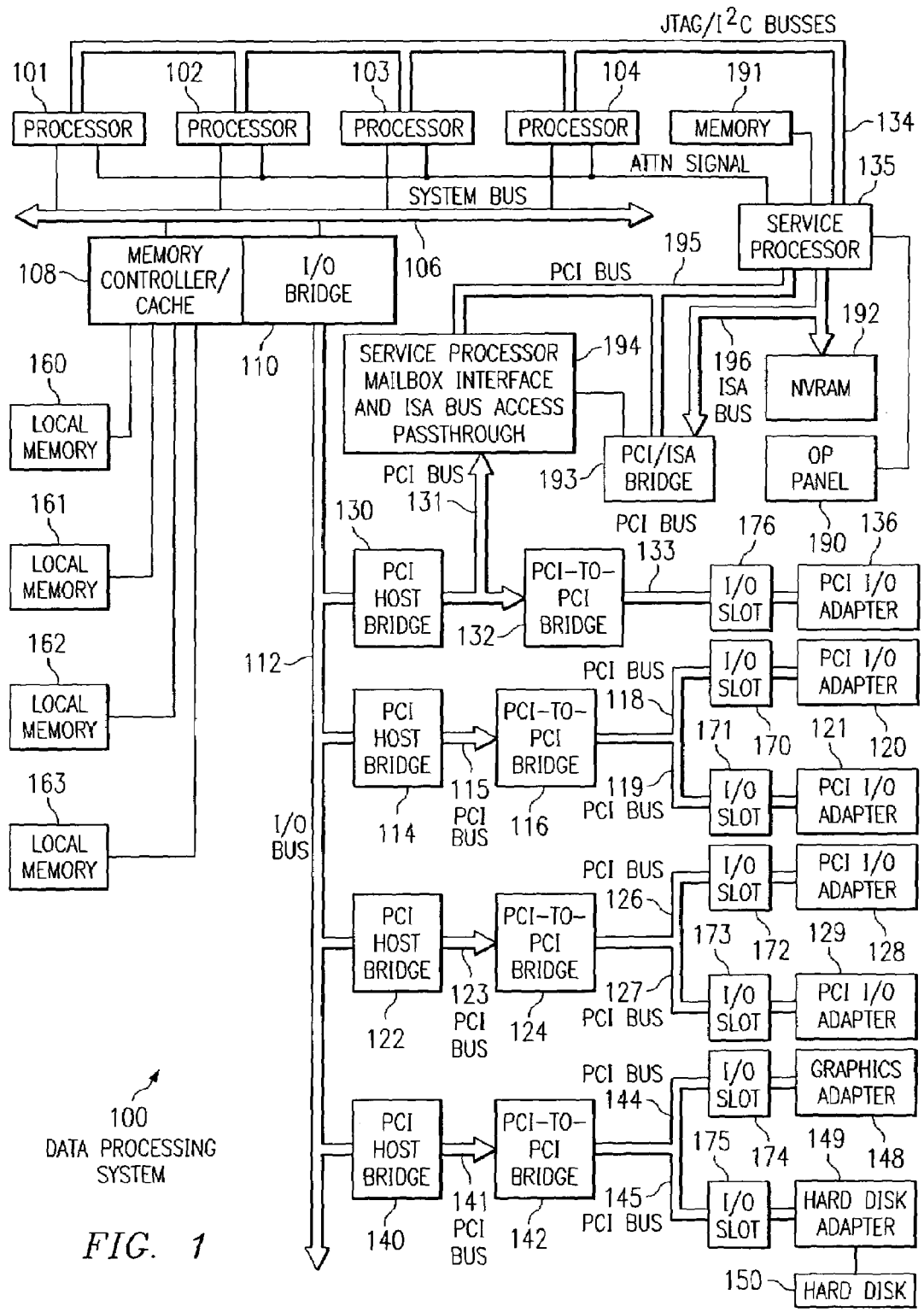
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P1. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCT bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCT host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass–through logic 194 and PCI-to-PCI bridge 132. Service processor mailbox interface and ISA bus access pass–through logic 194 forwards PCI accesses destined to the PCI/ISA bridge 193. NVRAM storage 192 is connected to the ISA bus 196. Service processor 135 is coupled to service processor mailbox interface and ISA bus access pass–through logic 194 through its local PCI bus 195. Service processor 135 is also connected to processors 101–104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP–panel 190.

When data processing system 100 is initially powered up, service processor 135 uses the JTAG/I²C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into local memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non–recoverable errors reported by processors 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
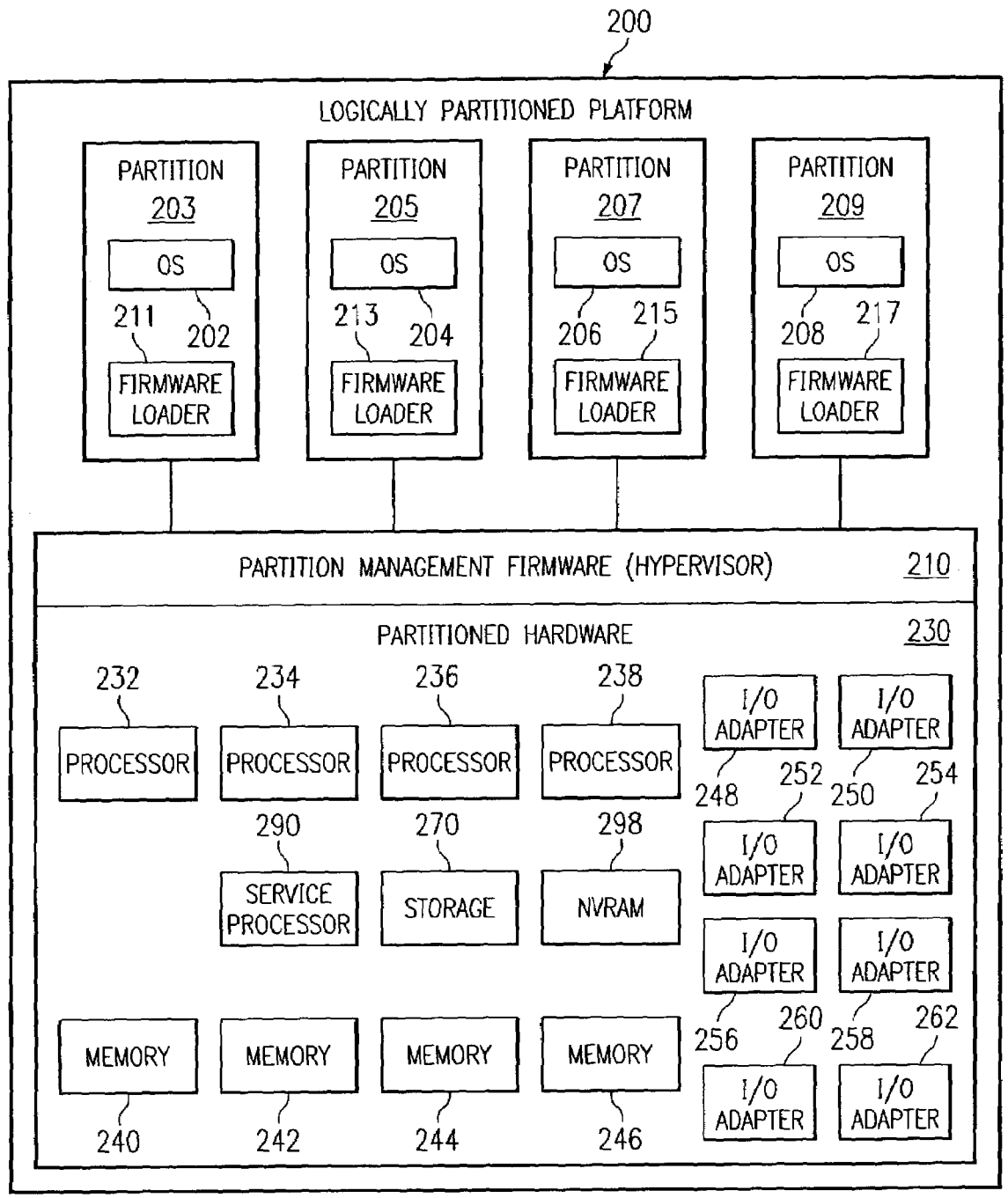
FIG. 2 is a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209. Additionally, these partitions also include firmware loaders 211, 213, 215, and 217. These firmware loaders may be implemented using RTAS. When partitions 203, 205, 207, and 209 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to multiple partitions within logically partitioned platform 200, each of which corresponds to one of operating systems 202, 204, 206, and 208. Most of NVRAM storage 298 is partitioned up for use by the different partitions, but this NVRAM also includes a common area, accessed by all of the partitions, in which the service processor places logs.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

The present invention provides a method, apparatus, and computer implemented instructions for managing the reporting of error information to different partitions in a logically partitioned data processing system. The mechanism of the present invention copies the error log into a buffer. In these examples, the buffer is accessible by all instances of the event scan function that may be called by the different partitions. The information is copied from the location usually used to store error logs, such as NVRAM 298 in FIG. 2. When the error log is copied into the buffer, this log is marked in the NVRAM as being old and reported. Additionally, the log that is copied into the buffer is assigned or given an expiration time stamp. This time stamp is used to determine when a log may be deleted or removed from the buffer. This buffer is also referred to as a partition log buffer. The partition log buffer may be located in various places in the data processing system. For example, the partition log buffer may be located in local memory, such as local memory 160 in FIG. 1. This buffer also may be located in a storage device, such as a hard disk drive or a tape drive. In this manner, an error log may be made available to any partition in a LPAR system within a selected period of time. Thus, partitions booted or started days or months after the machine has been started will not see error logs that are outdated even though these logs may be new to these particular partitions.

Turning now to FIG. 3, a diagram illustrating components used in managing error logs is depicted in accordance with a preferred embodiment of the present invention. In this example, partition management firmware 300 may be implemented using a hypervisor, such as partition management firmware 210 in FIG. 2. This firmware includes a function similar to the event scan function. However, the function includes managing logs in partition log buffer 302. This buffer is used to store the logs that are to be accessed by a partition, such as partition 304. NVRAM 306 is the location in which different subsystems place error logs in these examples. Other locations may be used depending on the implementation. A non-volatile storage is typically used to retain these logs if the data processing system is powered off.

Partition 304 may call an event scan function in partition management firmware 300 operating system 308 through firmware loader 310 to request error information. In response, partition management firmware 300 will call a retrieve log function in which the call includes the requesting partition number and the memory area in which the log is to be placed. This memory area identifies the area in which the requesting partition expects to receive the error information. If this function indicates that a log, such as log 312, is present in partition log buffer 302, then this function copies the information to the memory area identified in the call for use by the partition.

If the retrieve log function indicates that no new logs for the partition are present in partition log buffer 302, partition management firmware 300 will check NVRAM 306 to determine whether new and non-reported error logs are present. In this example, NVRAM 306 contains log 314 and log 316. If neither of these logs is new and non-reported, partition management firmware 300 returns a message to the calling partition indicating that no error information is present. If one or more of these logs are new and unreported, the new and unreported error log is copied from NVRAM 306 into partition log buffer 302. In these examples, only one log is copied into partition log buffer 302. Of course, depending on the implementation more than one log may be copied into this buffer. The error log copied into partition log buffer 302 is associated with a time period or time stamp to indicate when the log will be removed from partition log buffer 302. Further, the log copied into partition log buffer 302 is marked as being old and reported within NVRAM 306. After a new log is copied into partition log buffer 302, partition management firmware 300 will again call the retrieve log function now that a log is present in partition log buffer 302.

Turning next to FIG. 4, a diagram illustrating an example structure of a partition log buffer is depicted in accordance with a preferred embodiment of the present invention. Data structure 400 is an example of a data structure used to implement a partition log buffer, such as partition log buffer 302 in FIG. 3. In this example, line 402 is an index for the newest recorded log in the partition log buffer. Line 404 identifies an index, on a partition basis, as to what is the oldest log reported to a particular partition. Line 406 defines an area in the partition log buffer to record the expiration time of a log stored within the partition log buffer. Line 408 is used to identify whether a partition has started to report error logs. Line 410 is used to define the buffer used to hold the copy of the error log.

In this example, each error log in the partition log buffer is stored in a 1K buffer. The expiration time for a log is selected to be two hours. Further, in this particular implementation, the partition log buffer is designed to hold 64 logs. Of course, depending on the particular system and implementation, different sizes, times, and numbers of logs may be selected for the partition log buffer.

Figure 5:
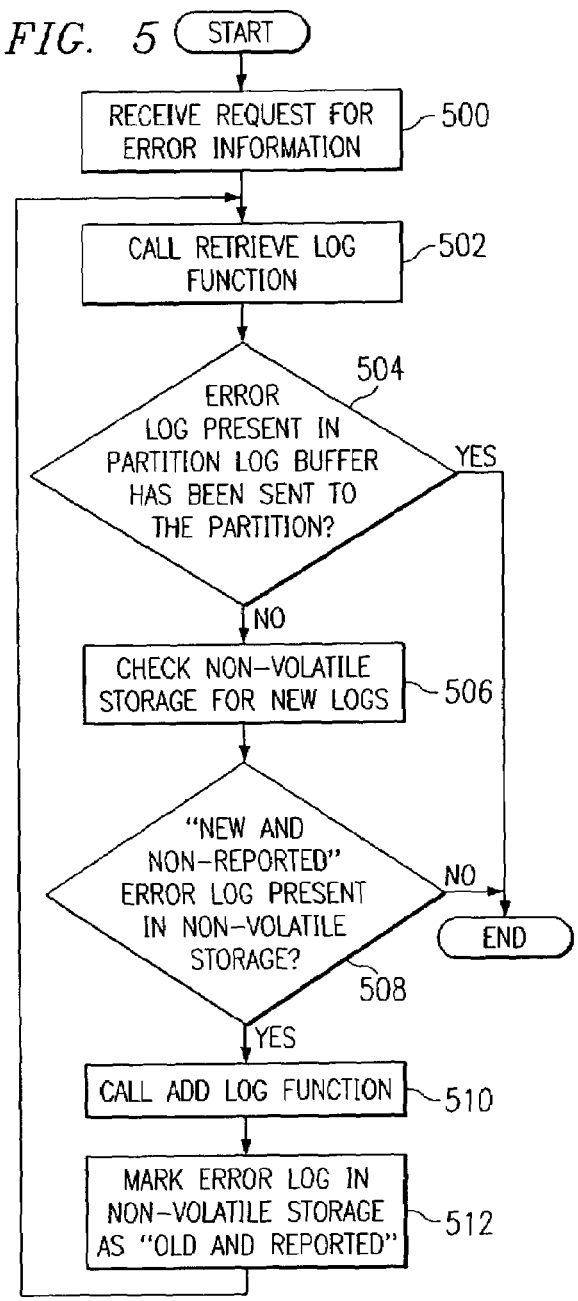
FIG. 5 is a flowchart of a process used for managing error logs in a logical partitioned data processing system in accordance with a preferred embodiment of the present invention.

With reference now to FIG. 5, a flowchart of a process used for managing error logs in a logical partitioned data processing system is depicted in accordance with a preferred embodiment of the present invention. The process illustrated in FIG. 5 may be implemented in a partition management firmware component, such as partition management firmware 300 in FIG. 3.

The process begins by receiving a request for error information (step 500). This request is received from a partition, such as partition 304 in FIG. 3. A retrieve log function is called (step 502). This function is described in more detail in FIG. 6 below. A determination is made as to whether an error log present in the partition log buffer has been copied or sent to the partition by the retrieve log function (step 504). If an error log has not been copied or sent by this function, the non-volatile storage is checked for new logs (step 506). In this example, the non-volatile storage is a NVRAM, such as NVRAM 306 in FIG. 3. A determination is made as to whether a "new and non-reported" error log is present in the non-volatile storage (step 508). A header may be included in NVRAM 306 to facilitate managing of logs. The header describes the location and status of each log in the NVRAM. In these examples, the status is indicated using a single byte. A value of 0 indicates that the log is old and unreported, while a value of 1 indicates that the log is new and unreported. If a "new and non-reported" error log is present in the non-volatile storage, an add log function is called (step 510). This function is used to copy the log from the non-volatile storage to the partition log buffer. Thereafter, the error log copied from the non-volatile storage to the partition log buffer is marked as "old and reported" (step 512) and the process returns to step 502 as described above.

With reference again to step 508, if a "new and non-reported" error log is absent in the non-volatile storage, the process terminates. Referring again to step 504, if the retrieve log function has copied or sent the error information, the error log, to the partition, the process also terminates.

Figure 6:
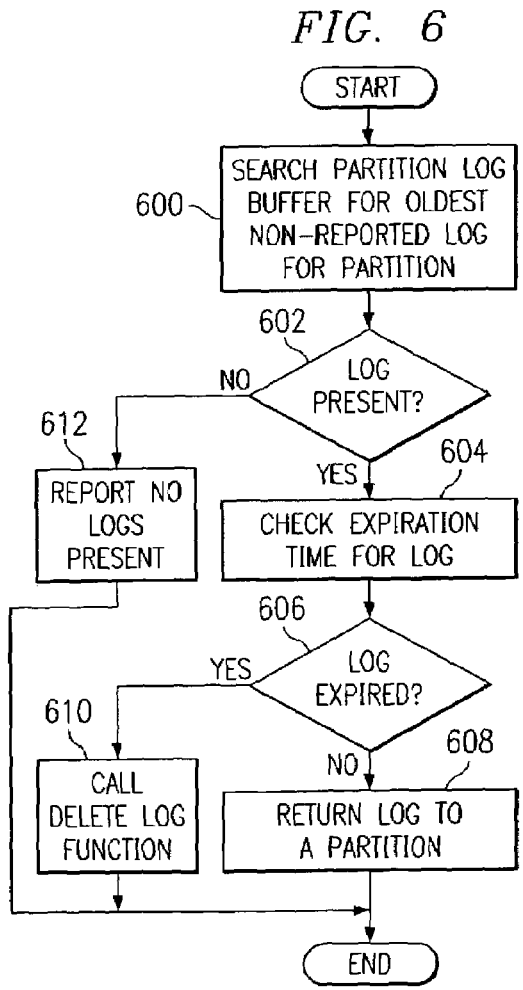
FIG. 6 is a flowchart of a process used for retrieving logs in accordance with a preferred embodiment of the present invention.

Turning now to FIG. 6, a flowchart of a process used for retrieving logs is depicted in accordance with a preferred embodiment of the present invention. The process illustrated in FIG. 6 may be implemented in a partition management firmware component, such as partition management firmware 300 in FIG. 3. The function illustrated in this flowchart is a more detailed description of a retrieve log function called in step 502 in FIG. 5.

The process begins by searching the partition buffer log for the oldest non-reported log for the partition (step 600). A determination is made as to whether a log is present in the partition log buffer (step 602). If a log is present, the expiration time for the log is checked (step 604). Next, a determination is made as to whether the log has expired (step 606). This determination may be made by checking a timer or time stamp assigned to the log. If the log has not expired, the log is returned to the partition (step 608) and the process terminates thereafter. In these examples, this log is returned or sent to a partition by copying the log to a memory location and using a partition number specified by the caller of this function.

With reference again to step 606, if a log has expired, a delete log function is called (step 610) and the process terminates thereafter. Referring again to step 602, if the log is not present, the process reports no logs are present (step 612) and the process terminates thereafter.

With reference now to FIG. 7, a flowchart of a process used for copying logs into a partition log buffer is depicted in accordance with a preferred embodiment of the present invention. The process illustrated in FIG. 7 may be implemented in a partition management firmware component, such as partition management firmware 300 in FIG. 3. This process is a more detailed description of an add log function called in step 510 in FIG. 5.

The process begins by copying the error log from the non-volatile storage into the partition log buffer (step 700). The current time is obtained (step 702). Two hours are added to the current time (step 704). This new time forms an expiration time stamp and is stored in association with the log (step 706) with the process terminating thereafter. This time stamp is used to determine whether a log has expired.

Turning now to FIG. 8, a flowchart of a process used for deleting a log in a partition log buffer is depicted in accordance with a preferred embodiment of the present invention. The process illustrated in FIG. 8 may be implemented in a partition management firmware component, such as partition management firmware 300 in FIG. 3. The process illustrated in this figure is a more detailed description of a delete log function called in step 610 in FIG. 6.

The process begins by erasing a log from the partition log buffer (step 800). The expiration time associated with the log also is erased (step 802) and the process terminates thereafter.

Thus, the present invention provides an improved method, apparatus, and computer instructions for managing error logs in a logical partitioned data processing system. Specifically, the mechanism of the present invention places error logs in a separate location from those used by different subsystems to report errors. The error logs placed into separate locations are associated with expiration times such that these logs will be deleted from the buffer after some selected period of time has passed. In this manner, partitions that are booted at a later time from when the data processing system is started will not receive outdated error logs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable–type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system for managing an error log, the method comprising:
   receiving a request from a partition within a plurality of partitions in the logical partitioned data processing system to access error information;
   determining whether the error information is located in a buffer;
   responsive to the error information being absent in the buffer, retrieving the error information from a non-volatile memory;
   assigning a selected period of time to the retrieved error information, wherein the selected period of time indicates when error information has expired; and
   storing the relieved error information retrieved from the non-volatile memory in the buffer only for the selected period of time, wherein error information is deleted from the buffer after the selected period of time has passed.

2. The method of claim 1 further comprising:
   sending the retrieved error information to the partition from the buffer.

3. The method of claim 1, wherein the retrieved error information is located in a data structure.

4. The method of claim 3, wherein the data structure is an error log.

5. The method of claim 1, wherein the non-volatile memory is a non-volatile random access memory.

6. The method of claim 1, wherein the error information is assigned an expiration time period.

7. The method of claim 1 further comprising:
   removing the retrieved error information from the buffer after the selected period of time has passed, wherein the plurality of partitions are unable to obtain outdated error information.

8. The method of claim 1, wherein the buffer is at least one of a random access memory, a tape drive, and a hard disk drive.

9. The method of claim 1, wherein the steps of receiving, determining, retrieving, and storing are performed by a partition management firmware.

10. A method in a logical partitioned data processing system for managing error logs, the method comprising:
    responsive to receiving a request for error information from a partition within a plurality of partitions in the logical partitioned data processing system, determining whether an error log is present in a buffer memory;
    responsive to an absence of the error log in the buffer memory, retrieving the error log from a non-volatile memory containing a set of error logs if the error log is unreported;
    assigning a selected period of time to the retrieved error log, wherein the selected period of time indicates when the error log has expired;
    storing the error log retrieved from the non-volatile memory in the buffer memory, wherein the error log is stored in the buffer only for the selected period of time, wherein error information is deleted from the buffer after the selected period of time has passed; and
    returning the error information to the partition using the error log stored in the buffer memory.

11. The method of claim 10 further comprising:
    deleting the error log from the buffer memory after the selected period of time.

12. The method of claim 11, wherein the selected period of time is identified using a time stamp associated with the error log.

13. The method of claim 10, wherein the error log is selected from the plurality of error logs as being an oldest non-reported error log.

14. The method of claim 10, wherein the steps of receiving, retrieving, storing, and returning are performed by a partition management firmware.

15. A logical partitioned data processing system for managing an error log, the logical partitioned data processing system comprising:
a bus system;
a communications unit connected to the bus system;
a memory connected to the bus system, wherein the memory includes a set of instructions; and
a processing unit connected to the bus system, wherein the processing unit executes the act of instructions to receive a request from a partition within a plurality of partitions in the logical partitioned data processing system to access error information; determine whether the error information is located in a buffer, retrieve the error information from a non-volatile memory in response to the error information being absent in the buffer; assigning a selected period of time to the retrieved error information, wherein the selected period of time indicates when the error information has expired; and store the retrieved error information retrieved from the non-volatile memory in the buffer in which the retrieved error information is stored in the buffer only for a selected period of time, wherein error information is deleted from the buffer after the selected period of time has passed.

16. A logical partitioned data processing system for managing error logs, the logical partitioned data processing system comprising:
a bus system;
a communications unit connected to the bus system;
a memory connected to the bus system, wherein the memory includes a set of instructions; and
a processing unit connected to the bus system, wherein the processing unit executes the set of instructions to determine whether an error log is present in a buffer memory in response to receiving a request for error information from a partition within a plurality of partitions in the logical partitioned data processing system; retrieve the error log from a non-volatile memory containing a set of error logs if the error log is unreported in response to an absence of the error log in the buffer memory; assigning a selected period of time to the retrieved error information, wherein the selected period of time indicates when the error information has expired; store the error log retrieved from the non-volatile memory in the buffer memory in which the error log is stored in the buffer only for the selected period of time, wherein error information is deleted from the buffer after the selected period of time has passed; and return the error information to the partition using the error log stored in the buffer memory.

17. A logical partitioned data processing system for managing an error log, the logical partitioned data processing system comprising:
receiving means for receiving a request from a partition within a plurality of partitions in the logical partitioned data processing system to access error information;
determining means for determining whether the error information is located in a buffer;
retrieving means, responsive to the error information being absent in the buffer, for retrieving the error information from a non-volatile memory;
assigning means for assigning a selected period of time to the retrieved error information, wherein the selected period of time indicates when the error information has expired; and
storing means for storing the retrieved error information retrieved from the non-volatile memory in the buffer only for the selected period of time, wherein error information is deleted from the buffer after the selected period of time has passed.

18. The data processing system of claim 17 further comprising:
sending means for sending the retrieved error information to the partition from the buffer.

19. The data processing system of claim 17, wherein the retrieved error information is located in a data structure.

20. The data processing system of claim 19, wherein the data structure is an error log.

21. The data processing system of claim 17, wherein the non-volatile memory is a non-volatile random access memory.

22. The data processing system of claim 17, wherein the error information is assigned an expiration time period.

23. The data processing system of claim 17 further comprising:
removing means for removing the retrieved error information from the buffer after the selected period of time has passed, wherein the plurality of partitions are unable to obtain outdated error information.

24. The data processing system of claim 17, wherein the buffer is at least one of a random access memory, a tape drive, and a hard disk drive.

25. The data processing system of claim 17, wherein the receiving means, determining means, retrieving means, and storing means are located in a partition management firmware.

26. A logical partitioned data processing system for managing error logs, the logical partitioned data processing system comprising:
determining means, responsive to receiving a request for error information from a partition within a plurality of partitions in the logical partitioned data processing system, for determining whether an error log is present in a buffer memory;
retrieving means, responsive to an absence of the error log in the buffer memory, for retrieving the error log from a non-volatile memory containing a set of error logs if the error log is unreported;
assigning a selected period of time to the retrieved error information, wherein the selected period of time indicates when error information has expired;
storing means for storing the error log retrieved from the non-volatile memory in the buffer memory for the selected period of time, wherein error information is deleted from the buffer the selected period of time has passed; and
returning means for returning the error information to the partition using the error log stored in the buffer memory.

27. The data processing system of claim 26 further comprising:
deleting moans for deleting the error log from the buffer memory after the selected period of time.

28. The data processing system of claim 27, wherein the selected period of time is identified using a time stamp associated with the error log.

29. The data processing system of claim 26, wherein the error log is selected from the plurality of error logs as being an oldest non-reported error log.

30. The data processing system of claim 26, wherein the receiving means, retrieving means, storing means, and returning means are located in a partition management firmware.

31. A computer program product in a computer readable medium for managing an error log, the computer program product comprising:
- first instructions for receiving a request from a partition within a plurality of partitions in the logical partitioned data processing system to access error information;
- second instructions for determining whether the error information is located in a buffer;
- third instructions, responsive to the error information being absent in the buffer, for retrieving the error information from a non-volatile memory;
- fourth instruction means for assigning a selected period of time to the retrieved error information, wherein the selected period of time indicates when error information has expired; and
- fifth instructions for storing the retrieved error information retrieved from the non-volatile memory in the buffer, wherein the retrieved error information is stored in the buffer only for a selected period of time, and wherein error information is deleted from the buffer after the selected period of time has passed.

32. A computer program product in a computer readable medium for managing error logs, the computer program product comprising:
- first instructions, responsive to receiving a request for error information from a partition within a plurality of partitions in the logical partitioned data processing system, for determining whether an error log is present in a buffer memory;
- second instructions, responsive to an absence of the error log in the buffer memory, for retrieving the error log from a non-volatile memory containing a set of error logs if the error log is unreported;
- third instructions for assigning a selected period of time to the retrieved error information, wherein the selected period of time indicates when error information has expired;
- fourth instructions for storing the error log retrieved from the non-volatile memory in the buffer memory for the selected period of time, wherein error information is deleted from the buffer after the selected period of time has passed; and
- fifth instructions for returning the error information to the partition using the error log stored in the buffer memory.

* * * * *